United States Patent
Larsson

(10) Patent No.: US 6,398,572 B1
(45) Date of Patent: Jun. 4, 2002

(54) SIM (SUBSCRIBER IDENTITY MODULE) CARD HOLDER WITH SEPARATE END STOP

(75) Inventor: Anders Larsson, Torna Hällestad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/666,158

(22) Filed: Sep. 19, 2000

(30) Foreign Application Priority Data

Sep. 20, 1999 (EP) .............................. 99610055

(51) Int. Cl.⁷ .............................................. H01R 13/62
(52) U.S. Cl. ........................................ 439/327; 439/347
(58) Field of Search ....................... 439/159, 44, 946, 439/325, 327, 328, 347; 235/441

(56) References Cited

U.S. PATENT DOCUMENTS

| | | | |
|---|---|---|---|
| 4,724,310 A | * | 2/1988 | Shimamura et al. ......... 235/441 |
| 4,931,622 A | * | 6/1990 | Ohtsuki et al. .............. 235/441 |
| 5,317,138 A | * | 5/1994 | Togawa ....................... 235/441 |
| 5,743,766 A | * | 4/1998 | Kaneshige et al. .......... 235/441 |
| 5,790,659 A | | 8/1998 | Strand ......................... 379/433 |
| 5,834,597 A | * | 4/1999 | Schwartz et al. ............ 235/441 |

FOREIGN PATENT DOCUMENTS

WO 98/13784 4/1998

OTHER PUBLICATIONS

"User's Guide –Mobile Phone T28," First Edition (Jun. 1999), Ericsson Mobile Communications AB, 1999, Publication No. EN/LZT 126–1456 R1A.

* cited by examiner

Primary Examiner—Brian Sircus
Assistant Examiner—Hae Moon Hyeon
(74) Attorney, Agent, or Firm—Burns, Doane, Swecker & Mathis, L.L.P.

(57) ABSTRACT

A SIM card holder for an electronic device comprising a PCB (4) and an interior base (3). The SIM card holder comprises a connector part (5) provided with connectors (6), said connector part (5) being mounted on the PCB (4), guides (7) for guiding the SIM card (1) along two parallel opposite sides and a first end stop and a second end stop provided at two opposite sides other than said sides of the SIM card holder. Each end stop is provided as a part connected to the PCB (4) and at least one of the end stops is displaceable.

11 Claims, 1 Drawing Sheet

SIM (SUBSCRIBER IDENTITY MODULE) CARD HOLDER WITH SEPARATE END STOP

Figure 1:
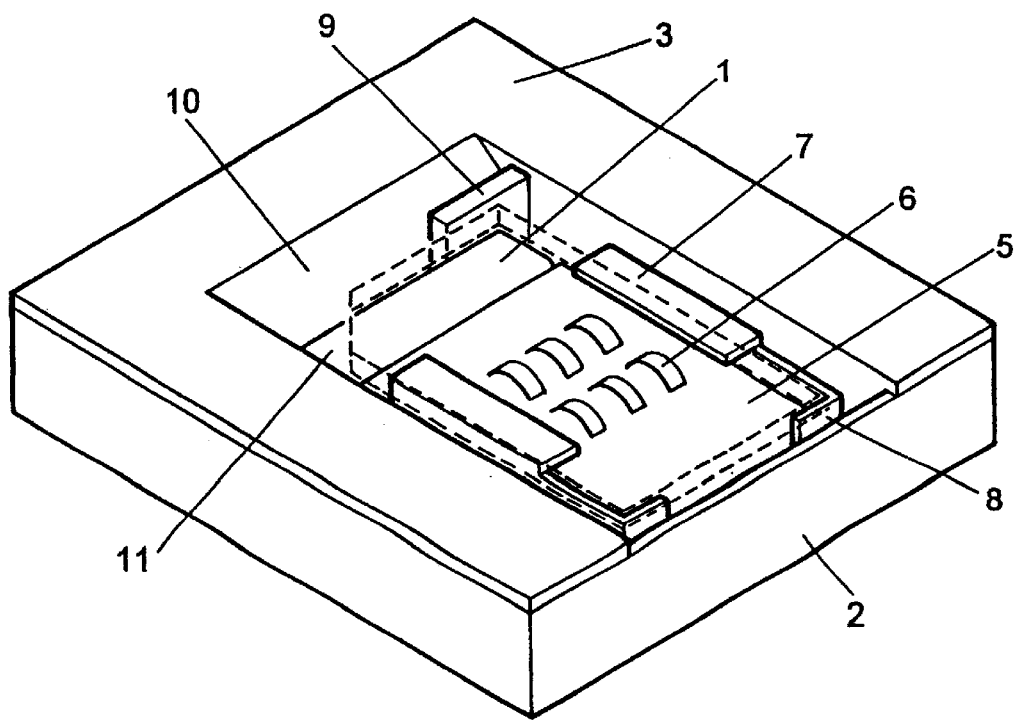

This application claims priority under 35 U.S.C. §§119 and/or 365 to 99 610 055.8 filed in Europe on Sep. 20, 1999; the entire content of which is hereby incorporated by reference.

The invention relates to a SIM card holder for an electronic device comprising a PCB and an interior base, said SIM card holder comprising a connector part provided with connectors, said connector part being mounted on the PCB, guides for guiding the SIM card along two parallel opposite sides and a first end stop and a second end stop provided at two opposite sides other than said sides of the SIM card holder.

The electronic device may be a mobile radio station such as a mobile telephone, a communicator, a pager, or the like.

Electronic devices such as those mentioned above are getting smaller and smaller and in line with this all the structural parts of the device have to be smaller. This includes the SIM card holder which is configured for holding a SIM (Subscriber Identity Module) card in order to identify the user of the device. The SIM card contains information about the user and is in contact with the PCB (Printed Circuit Board) via connectors provided on the PCB when it is mounted in the electronic device.

Different types of SIM card holders are known today. Some have complex designs including hinges and displaceable parts while others have relatively simple designs.

A known SIM card holder having a simple design comprises a connector part that is surface mounted on the PCB, said connector part being provided with connectors which are brought into contact with the terminals of the SIM card when it is mounted in the SIM card holder. Further, the connector part is provided with to metal guides extending upwards from the connector part, said metal guides guiding the SIM card along two parallel opposite sides when it is slidingly inserted between the metal guides. One end stop of the SIM card holder is provided by a part of the frame of the electronic device, this end featuring an inclined face to facilitate the mounting and dismounting of the SIM card. A small part of the inclined face is perpendicular to the sliding direction of the SIM card in order to form an end stop for the SIM card. The other end stop features an upwardly extending wall mounted on the connector part.

Though simple in design, the known SIM card holder has some disadvantages. First, the dismounting of the SIM card is difficult because one end of the SIM card has to be lifted over the end stop provided at the inclined face before it can be slided out of the metal guides. Second, the manufacturing tolerances of the various parts of the SIM card holder are very small in order to ensure a correct contact between the SIM card and the connectors mounted on the PCB. However, these tolerances are difficult to meet because the terminals are mounted on the PCB and one end stop is made as a part of the frame of the device, and these two parts—the PCB and the frame of the device—are not firmly connected at the area of the SIM card holder.

Therefore, there is a need for a simple SIM card holder which overcomes these disadvantages, and the object of the invention is to provide such a SIM card holder.

This is accomplished by a SIM card holder as mentioned in the introduction wherein each end stop is provided as a part connected to the PCB and wherein at least one of the end stops is displaceable.

Since each end stop is provided as a part extending from the PCB and that one of the end stops is displaceable, it is achieved firstly that the distance between the two end stops is clearly defined at all times and the manufacturing tolerances of the end stop can therefore be very narrow which ensures that the SIM card is positioned correctly in the SIM card holder, and secondly that, despite the narrow tolerances, the dismounting of the SIM card is easy.

In a preferred embodiment the guides for guiding the SIM card along two parallel opposite sides extend from the connector part whereby the positioning of the SIM card laterally is well-defined.

Preferably the first end stop extends from the connector part whereas the second end stop is a discrete component mounted on the PCB. Hereby the area of the PCB between the connector part and the second end stop can be used for other electronic components whereby the size of the electronic device can be minimised.

In a preferred embodiment the second end stop extends through an aperture provided in the interior base of the electronic device. This means that the electronic components positioned between the connector part and the second end stop are protected by a part of the interior base which at the same time may serve as a guide face for the SIM card during mounting.

Preferably the second end stop is displaceable and it may comprise a springbiased pin or a tap provided with an resilient tongue. When dismounting the SIM card, the second end stop is displaced and the SIM card can be removed out of the SIM card holder. The second end stop subsequently reverts to its protruding position.

The electronic device is preferably a mobile radio station, such as a mobile telephone or a communicator.

It shall be emphasised that the term "comprise/comprising" when used in this specification is taken to specify the presence of stated features, integers, steps or components but does not preclude the presence or addition of one or more other features, integers, steps components or groups thereof.

Figure 2:
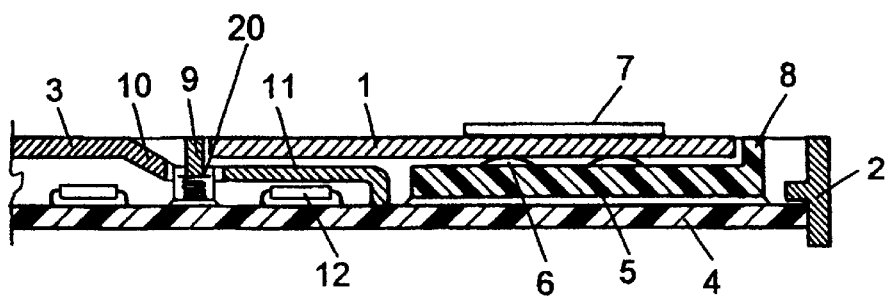
Figure 3:
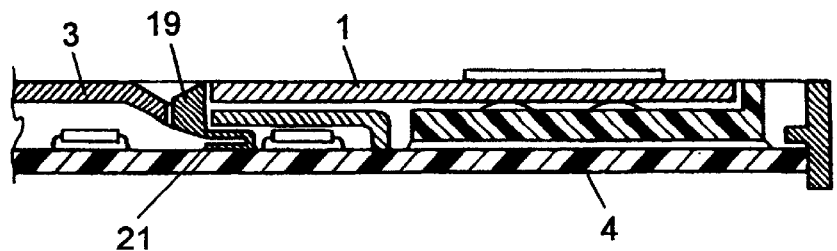

The invention will be described in detail in the following with reference to the drawings in which FIG. 1 shows a part of an electronic device having a SIM card holder according to a first embodiment of the invention, FIG. 2 shows a cross-section of the embodiment shown in FIG. 1, and FIG. 3 shows a cross-section of a second embodiment of the invention.

FIG. 1 shows a part of an electronic device with a SIM card holder according to the invention and FIG. 2 shows a cross-section of the same. For clarity, the SIM card 1 is shown with dotted lines in FIG. 1. The electronic device has a frame comprising an end wall 2 and an interior base 3. A PCB 4 is mounted in the frame of the device and the PCB 4 is provided with a connector part 5 provided with six connectors 6 which are brought into contact with the terminals of the SIM card 1 when it is mounted in the SIM card holder. At the sides of the connector part 5 are provided metal guides 7 that guide the SIM card 1 in the longitudinal direction during mounting.

Two walls 8 extending upwardly from the connector part 5 together define an end stop for the SIM card 1 at the first end thereof, and a springbiased, downwardly displaceable pin 9 defines an end stop for the SIM card 1 at the second end thereof. The first end stop may be provided as only one wall extending upwardly from the connector part 5 instead of two walls 8 as shown. An inclined face 10 is provided that leads from the top of the interior base 3 to a guide face 11 positioned at the same level as the top surface of the connector part 5. The inclined face 10 facilitates mounting and dismounting of the SIM card 1 in the SIM card holder.

The guide face 11 is a part of the interior base 3, said guide face 11 guiding the SIM card 1 to the metal guides 7 provided on the connector part 5 when it is mounted in the SIM card holder.

When mounting the SIM card 1 in the SIM card holder, the SIM card 1 is positioned with its first end ready to be slided between the metal guides 7 at the left end of the metal guides 7 in FIG. 1. Due to the springbiased pin 9 and the inclined face 10, the SIM card 1 has a slanting appearance in this position. However, since the SIM card 1 has some flexibility it can be moved forwards in between the metal guides 7 until it reaches the upwardly extending walls 8. In this position the other end of the SIM card 1 has just passed the springbiased pin 9 and flexes downwards. The springbiased pin 9 serves as an end stop at this end of the SIM card 1.

For facilitating mounting of the SIM card 1, the springbiased pin 9 can be pushed downwards when the SIM card 1 has a slanting appearance before entering between the metal guides 7.

In FIG. 2 it is seen that the springbiased pin 9 extends through an aperture 20 provided in the interior base 3. As well the connector part 5 as the springbiased pin 9 are mounted—preferably surface mounted—on the PCB 4. This means that all the holding parts of the SIM card holder are in rigid connection with the PCB 4 and therefore have fixed positions in relation to each other. Thus, the distance between the two end stops provided by the upwardly extending walls 8 and the springbiased pin 9 is very well defined at all times and can be made with very small tolerances that can be adapted to the extent of the SIM card 1. The correct position of the mounted SIM card 1 is ensured since the SIM card holder can be made without—or at least almost without—any play between the SIM card holder parts and the SIM card 1.

The major advantage of the SIM card holder according to the invention appears, however, when the SIM card 1 is to be dismounted. This is considerably facilitated since the springbiased pin 9 can be displaced downwards whereby the SIM card 1 via the inclined face 10 can easily be slided out of the SIM card holder. The springbiased pin 9 has an extension beyond the side edge of the SIM card 1 and may be pushed downwards by a nail or the like in this area without interfering with the SIM card 1 when it is slided out of the SIM card holder.

Preferably the springbiased pin 9 is not a part of the connector part 5 since there is a need for utilising as large a part of the PCB 4 as possible for electronic components. This can be seen in FIG. 2 where the space underneath the guide face 11 is used for electronic components 12 that are surface mounted on the PCB 4.

In the embodiment shown in FIGS. 1 and 2 the springbiased pin 9 has a box-like appearance. It may, however, have any other shape, and the spring mechanism may be provided in another way.

FIG. 3 shows another embodiment of the invention where the springbiased pin 9 in FIGS. 1 and 2 has been replaced by a tap 19 provided with a resilient tongue 21 that, due to its shape, defines an inherent spring mechanism. All the other parts of the SIM card holder are identical with the corresponding parts in the embodiment shown in FIGS. 1 and 2.

The tap 19 is surface mounted on the PCB 4 and extends through an aperture in the interior base 3. The tap 19 defines an end stop for the SIM card 1 and it may be pushed downwards by a nail or the like for facilitating dismounting of the SIM card 1.

The second end stop need not be provided with a spring mechanism as shown to be displaceable. For instance, the second end stop may be provided as a pin that can be removed from the device, e.g. by unscrewing the pin.

Furthermore, the displaceable pin may be arranged in such a way that it is displaceable in a direction parallel with the face of the SIM card instead of perpendicular to the face of the SIM card as shown in FIGS. 1–3.

The SIM card holder may be modified in other ways without departing from the general concept of the invention.

What is claimed is:

1. A SIM (Subscriber Identity Module) card holder for an electronic device comprising a PCB (Printed Circuit Board) and an interior base, said SIM card holder comprising a connector part provided with connectors, said connector part being mounted on the PCB, guides for guiding the SIM card along two parallel opposite sides, and a first and a first end stop and a second end stop provided at two opposite sides other than said sides of the SIM card holder, said end stops being provided for restricting the movement of the SIM card along the guides, wherein the end stops are provided as separate parts that are separately connected to the PCB and wherein at least one of the end stops is displaceable.

2. A SIM card holder according to claim 1, characterised in that the guides (7) extend from the connector part (5).

3. A SIM card holder according to claim 1, characterised in that the first end stop extends from the connector part (5).

4. A SIM card holder according to claim 1, characterised in that the second end stop is a discrete component mounted on the PCB (4).

5. A SIM card holder according to claim 1, characterised in that the second end stop extends through an aperture provided in the interior base (3) of the electronic device.

6. A SIM card holder according to claim 1, characterised in that the second end stop is displaceable.

7. A SIM card holder according to claim 6, characterised in that the second end stop comprises a springbiased pin (9).

8. A SIM card holder according to claim 6, characterised in that the second end stop comprises a tap (19) provided with an resilient tongue.

9. A SIM card holder according to claim 1, characterised in that the electronic device is a mobile radio station, such as a mobile telephone or a communicator.

10. An electronic device with a SIM card holder, characterised in that the electronic device comprises a SIM card holder according to claim 1.

11. An electronic device according to claim 10, characterised in that it is a mobile radio station, such as a mobile telephone or a communicator.

* * * * *